Aug. 25, 1953 J. B. PICARD 2,650,064
DRAWWORKS
Filed June 3, 1949 2 Sheets-Sheet 1
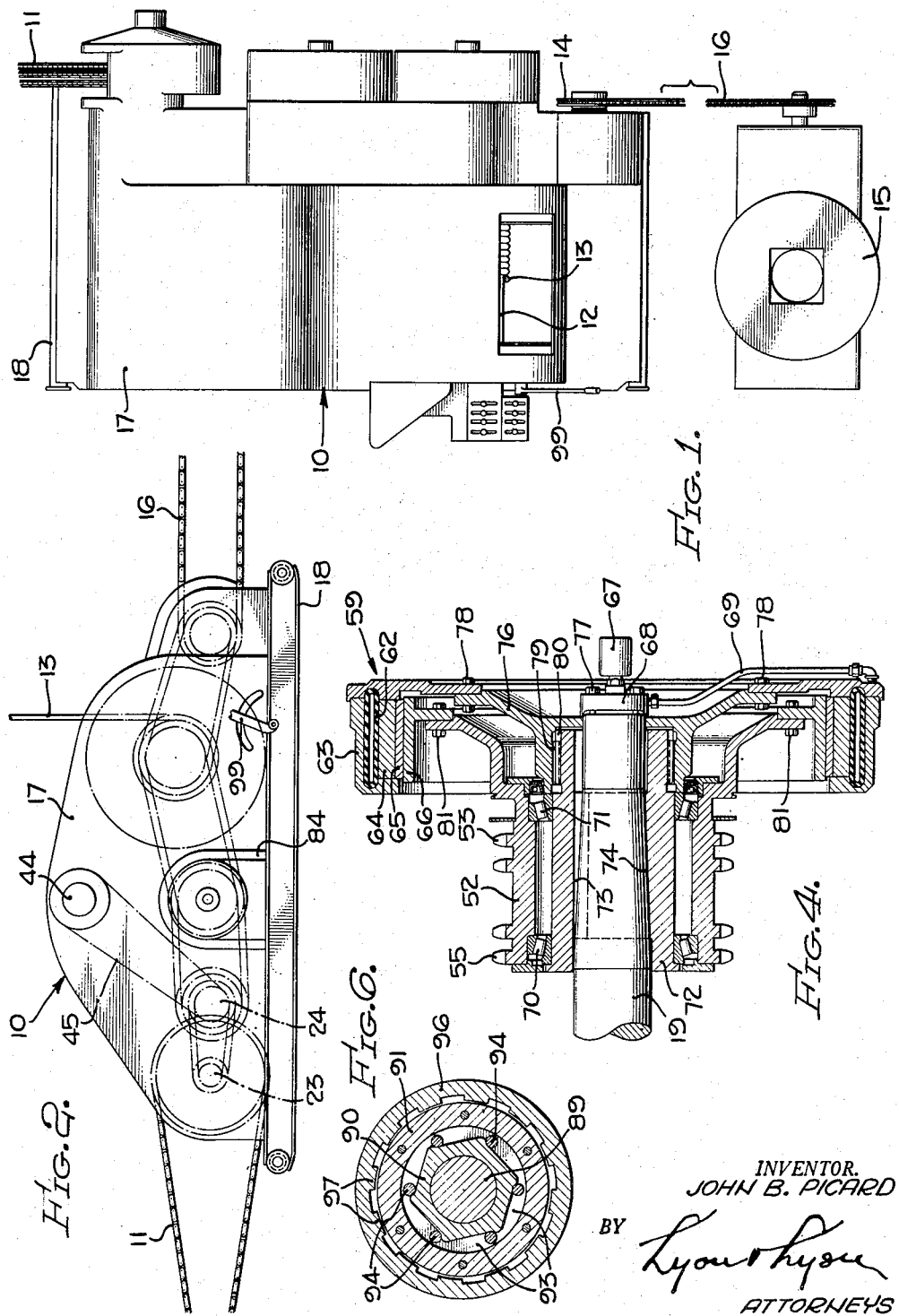
INVENTOR.
JOHN B. PICARD
BY
ATTORNEYS

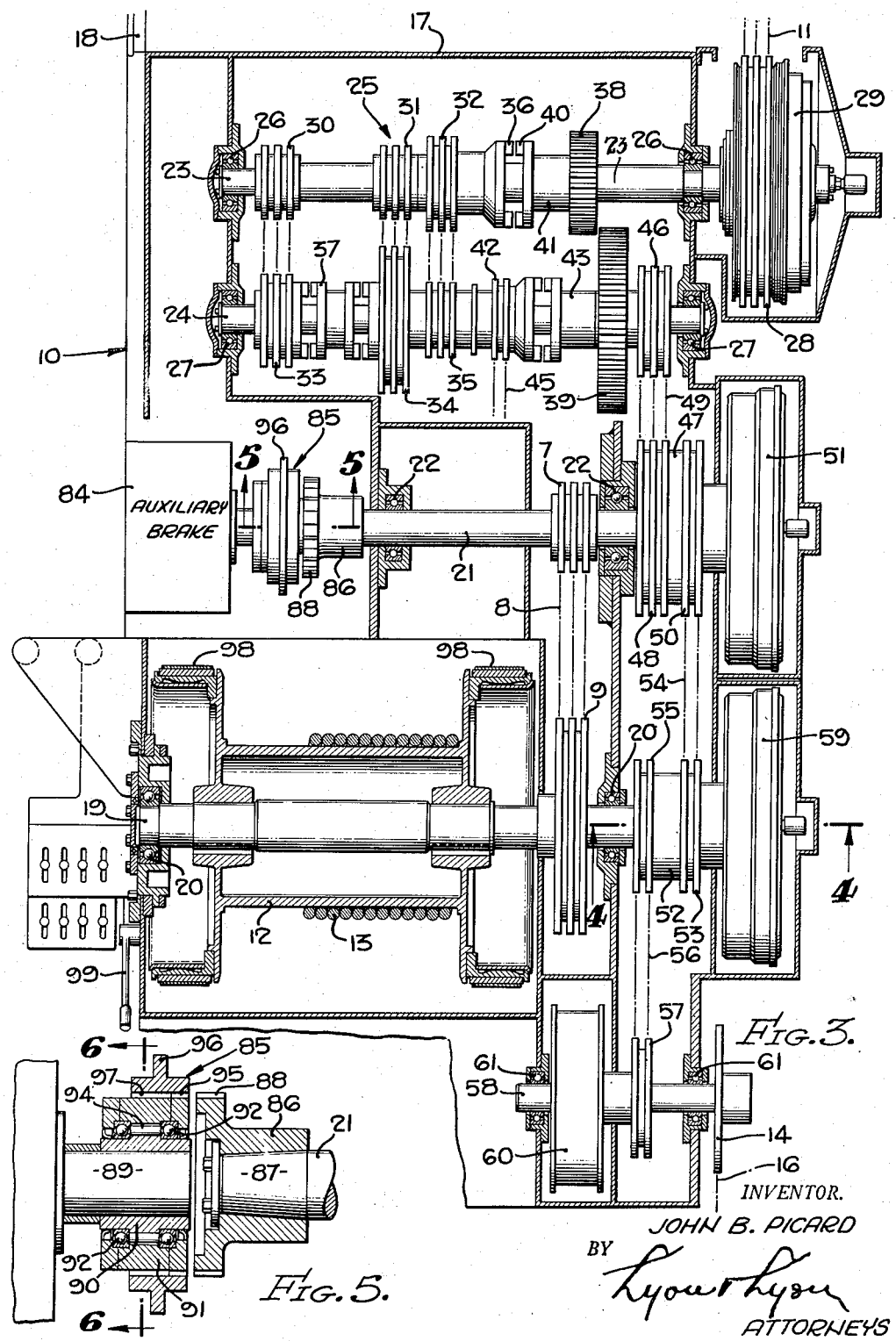

Patented Aug. 25, 1953

2,650,064

UNITED STATES PATENT OFFICE 2,650,064

DRAWWORKS

John B. Picard, Los Angeles, Calif., assignor to The National Supply Company, Pittsburgh, Pa., a corporation of Pennsylvania Application June 3, 1949, Serial No. 97,055

9 Claims. (Cl. 254—187)

This invention relates to well drilling apparatus and is particularly directed to improvements in the construction of rotary drawworks.

The principal object of this invention is to provide a novel form of "single package" drawworks adapted for highway transportation as a unit.

Another object is to provide a rotary drawworks having novel means for selectively connecting an auxiliary brake to impede rotation of the spooling drum.

Another object is to provide a drawworks having a drumshaft driven at either of two speeds from rotary elements on a lineshaft, one of the drives to the drumshaft providing a means for connecting an auxiliary brake to impede rotation of the spooling drum.

Another object is to provide a novel form of disengageable over-running clutch assembly for driving the auxiliary brake.

Other and more detailed objects and advantages will appear hereinafter.

In the drawings:

Figure 1 is a top plan view showing a preferred embodiment of my invention, the various guards being in place.

Figure 2 is a side elevation thereof.

Figure 3 is a sectional plan view in diagrammatic form.

Figure 4 is a sectional view taken substantially on the lines 4—4 as shown in Figure 3.

Figure 5 is a sectional view taken substantially on the lines 5—5 as shown in Figure 3.

Figure 6 is a transverse sectional view taken substantially on the lines 6—6 as shown in Figure 5.

Referring to the drawings, the drawworks unit generally designated 10 is driven from a source of power (not shown) through drive chain 11. The drawworks unit 10 is provided with a spooling drum 12 for winding up a cable 13 and is also provided with a power take-off sprocket 14 adapted to drive a rotary machine 15 through a drive chain 16. The drawworks unit 10 includes a frame assembly 17 mounted on parallel skids 18. Four parallel shafts are rotatably supported on the frame 17. Thus the drumshaft 19 is rotatably supported on axially spaced bearings 20 and the lineshaft 21 is rotatably supported on axially spaced bearings 22.

The power shaft 23 and jackshaft 24 comprise the driving and driven shafts in a change-speed transmission unit generally designated 25. The power shaft 23 is rotatably supported on spaced bearings 26 and the jackshaft is rotatably supported on axially spaced bearings 27. Power transmitted through the drive chain 11 from a source of power (not shown) turns the drive sprocket 28 relative to the power shaft 23. A fluid operated friction clutch assembly 29 serves to releasably connect the drive sprocket 28 in driving relationship with the power shaft 23. Three forward speeds are provided by the change-speed transmission 25 whereby the power shaft 23 may rotate the jackshaft 24. These forward speeds are provided by driving sprockets 30, 31 and 32 which are aligned and connected by chain to jackshaft sprockets 33, 34 and 35 respectively. The sprockets 30 and 31 are fixed on the power shaft 23 while the sprocket 32 is rotatably mounted thereon and is provided with clutch jaws 36. The sprockets 33 and 34 are each rotatively mounted upon the jackshaft 24, and an axially slidable clutch 37 is positioned between them and is adapted to connect either in direct driving relationship with the jackshaft 24. The driven sprocket 35 is fixed on the jackshaft.

A reverse drive is also provided for driving the jackshaft 24 in a reverse direction from the power shaft 23. This reverse drive includes the gear 38 splined to the power shaft 23 and axially slidable into mesh with the gear 39 which is fixed on the jackshaft 24. Clutch jaws 40 are provided on the same member 41 as the gear 38, and accordingly axial sliding movement of the member 41 toward the left as viewed in Figure 3 engages the clutch jaws 36 and 40 to effect a drive to the jackshaft 24 through sprockets 32 and 35. When the member 41 is shifted to the right as shown in Figure 3, the gears 38 and 39 are brought into mesh so that the jackshaft 24 is driven in a reverse direction from the power shaft 23.

A driving sprocket 42 is rotatably mounted on the jackshaft 24 and is adapted to be clutched into driving relationship therewith by means of the axially shiftable clutch 43. The sprocket 42 is adapted to rotate the catshaft 44 through chain 45.

The driving sprocket 46 which is fixed on the jackshaft 24 constitutes the power take-off sprocket for the change-speed transmission 25. This sprocket 46 is adapted to drive a dual sprocket member 47 which is rotatably mounted on one of the overhanging ends of the lineshaft 21. This dual sprocket member 47 includes a driven sprocket 48 which is connected by chain 49 to the driving sprocket 46. The dual sprocket member 47 also includes a driving sprocket 50. The sprockets 48 and 50 rotate as a unit. A fluid actuated friction clutch assembly 51 provides a means for releasably connecting the dual sprocket member 47 in direct driving relationship with the lineshaft 21.

A similar dual sprocket member 52 is rotatably mounted on the overhanging end of the drumshaft 19. This member 52 includes a driven sprocket 53 connected with the sprocket 50 by means of chain 54. The dual sprocket member 52 also includes driving sprocket 55 which is connected by chain 56 to the sprocket 57 on the countershaft 58. The dual sprocket member 52 is adapted to be releasably connected in driving relationship with the drumshaft 19 by means of the fluid actuated friction clutch 59.

A fluid actuation friction clutch 60 is adapted to establish a driving connection between the sprocket 57 and the countershaft 58. The power take-off sprocket 14 is fixed on the countershaft 58 and is positioned outside the supporting bearings 61.

The fluid actuated friction clutches 29, 51, 59 and 60 may be of substantially the same design and construction. The sectional view of the clutch 59 as shown in Figure 4 generally illustrates the construction of each of the other fluid actuated friction clutches. As shown in Figure 4 an annular inflatable tube 62 is confined within a housing 63 and is adapted when in operative position to move shoes 64 radially inwardly to engage the friction lining 65 with the drum 66. When the tube 62 is deflated the shoes 64 and lining 65 move radially outwardly and the frictional driving connection between the housing 63 and drum 66 is interrupted. The ring 62 may be inflated by air pressure supplied through rotary stuffing box 67, collar 68 and piping 69.

As shown in Figure 4 the dual sprocket member 52 is rotatably mounted on bearings 70 and 71 carried on a hub 72 which is fixed to the drumshaft 19 by means of one or more axially extending keys 73. The overhanging portion of the shaft 19 includes a taper section 74 and the bore of the hub 72 fits this taper. A portion of the hub 72 is encircled by the spider 76 which is clamped in position by means of the collar 68. The collar 68 is secured to the shaft end by means of a plurality of bolts 77. The housing 63 is connected to the spider 76 by any convenient means such as, for example, bolts 78. The spider 76 is nonrotatably connected to the hub 72 by means of internal splines 79 on the spider which engage external splines 80 on the hub. The dual sprocket member 52 is connected to the drum 66 by bolts 81.

From this description it will be understood that the housing 63 rotates with the drumshaft 19, and the drum 66 rotates with the dual sprocket member 52. The entire assembly including the sprocket member 52, clutch 59 and hub 72 may be removed from the end of the shaft as a unit upon release of the bolts 77 holding the retaining collar 68 to the end of the shaft 19.

The mounting of the dual sprocket member 47 is substantially the same as that shown in Figure 4 with reference to the dual sprocket member 52.

Low speed drive means are provided for driving the spooling drum from the lineshaft 21, and as shown in the drawings this includes a sprocket 7 fixed on the lineshaft 21 connected by chain 8 to drive sprocket 9 which is fixed on the drumshaft 19. High speed drive means for the spooling drum 12 is provided through dual sprocket members 47 and 52 by way of chain 54 and by clutch 59.

An auxiliary brake 84 is mounted in axial alignment with the lineshaft 21. This brake may be of hydraulic, electric, or may take the form of any other suitable energy absorbing device. The auxiliary brake 84 may be connected in driving relationship with the lineshaft 21 by means of the releasable over-running clutch assembly generally designated 85. This assembly includes a hub 86 fixed to the tapered end 87 of the lineshaft 21. The hub is provided with external splines 88. The brake shaft 89 is disposed in axial alignment with the lineshaft 21 and is provided with a hub 90 fixed thereto. A ring 91 is rotatably mounted on the hub 90 by means of axially spaced bearings 92. The hub and ring cooperate to form a plurality of arcuate recesses 93 in which rollers 94 are disposed. As viewed in Figure 6, when the ring 91 rotates in a clockwise direction the rollers connect the ring 91 in driving relationship with the hub 90, but when the ring 91 turns in a counterclockwise direction the rollers move to the large end of the recesses and the ring 91 turns without driving the hub 90. The ring is provided with a series of external splines 95 positioned adjacent the splines 88. A shiftable collar 96 is provided with internal splines 97. The collar 96 may be axially shifted to the right as viewed in Figure 3 in order to connect the hub 86 and ring 91 in direct driving relationship. When the collar 96 is in the operative position shown in Figure 3 the auxiliary brake 84 is disconnected from the lineshaft 21.

In operation the hoisting operations are carried on at any one of the three speeds available through the change-speed transmission 25 and through either the high speed or low speed drive provided between the lineshaft 21 and spooling drum 12. When a low speed drive is required the fluid operated friction clutch 51 is engaged and the fluid operated friction clutch 59 is disengaged. The drive then takes place through sprockets 46, 48, clutch 51, shaft 21 and sprockets 7 and 9. When a high speed drive is required the fluid operated friction clutch 51 is disengaged and the clutch 59 is engaged. The drive then passes through sprockets 46, 48, 50, clutch 59 and drumshaft 19. It will be observed that when the drum 12 is driven by the high speed drive through sprockets 50 and 53, the lineshaft is rotated through sprockets 9 and 7, but this is not objectionable because the lineshaft merely idles and is not connected to drive anything.

When it is desired to drive the rotary machine 15 the fluid operated friction clutch 60 is engaged so that the power take-off sprocket 14 is driven through sprockets 46, 48, 50, 53, 55, 57, clutch 60 and countershaft 58. While the rotary machine is in operation turning the drill string (not shown), the drum 12 is allowed to turn slowly in a reverse direction to unspool cable for lowering the drill string and bit into the drilled hole. Control of the unspooling movement of the drum is accomplished through conventional brake bands 98 trained over the brake rims. A brake actuating lever 99 is provided for actuating the brake bands.

In conventional drilling practice the drill string is withdrawn from time to time for the purpose of changing the bit. It is reinserted into the well hole section by section and connected by threaded couplings. When the drill string is long the weight becomes greater than can be conveniently handled by the brake bands on the rims 98, and accordingly it is the usual practice to employ an auxiliary brake for impeding rotation of the drum when lowering the drill string into the hole. Such auxiliary brakes are commonly located in coaxial alignment with the drumshaft, but such a location is not possible on a heavy duty, high capacity, single package drawworks because the size of the brake is such that it cannot be included within the width limitations imposed for highway transportation.

In accordance with my invention I position the auxiliary brake 84 in alignment with the lineshaft 21 and drive it through the same transmission connections as are employed for the low speed hoisting drive for the spooling drum. Since the sprocket 9 is larger than the sprocket 7 in the low speed drive, the lineshaft 21 rotates at a greater speed than the drumshaft 19. This high speed is particularly advantageous when driving an auxiliary brake since a smaller brake can be used to provide the same braking effect for the spooling drum.

During drilling operations while the rotary machine is turning and during hoisting operations, the auxiliary brake 84 is normally disconnected from the lineshaft 21. This is accomplished by moving the axially shiftable collar 96 to its inoperative position as shown in Figure 3. When the drill string is being lowered into the hole, however, the collar 96 is shifted to connect the lineshaft 21 to the auxiliary brake through the over-running clutch assembly 85. Forward rotation of the drum when hoisting the empty blocks (not shown) is not impeded because the overrunning feature of the clutch disconnects the brake from the lineshaft 21. When the drum turns in a direction to lower the blocks and drill string, however, the clutch connects the lineshaft 21 to the auxiliary brake 84 so that rotation of the spooling drum 12 is impeded.

Having fully described my invention, it is to be understood that I do not wish to be limited to the details herein set forth, but my invention is of the full scope of the appended claims.

I claim:

1. In a rotary drawworks, the combination of a drumshaft, a spooling drum on said drumshaft, a lineshaft, low speed drive means whereby the lineshaft may drive the spooling drum, including a large driven sprocket fixed relative to the spooling drum and a small driving sprocket fixed relative to the lineshaft and connected by a chain, an auxiliary brake positioned coaxially of the lineshaft, and over-running clutch means for connecting the brake to the lineshaft whereby the brake may be driven at a greater speed than the drum when the latter is turning in an unspooling direction.

2. In a rotary drawworks, the combination of a drumshaft, a spooling drum on said drumshaft, a lineshaft, low speed drive means whereby the lineshaft may drive the spooling drum, including a large driven sprocket fixed relative to the spooling drum and a small driving sprocket fixed relative to the lineshaft and connected by a chain, an auxiliary brake positioned coaxially of the lineshaft, over-running clutch means for connecting the brake to the lineshaft whereby the brake may be driven at a greater speed than the drum when the latter is turning in an unspooling direction, and high speed drive means for driving the spooling drum including a driving member rotatably mounted on the lineshaft.

3. In a rotary drawworks, the combination of a drumshaft, a spooling drum on said drumshaft, a lineshaft, low speed drive means whereby the lineshaft may drive the spooling drum, including a driven element fixed relative to the spooling drum and a driving element fixed relative to the lineshaft, a first member rotatably mounted coaxially of the lineshaft, a clutch for releasably connecting said member in driving relationship with the lineshaft, high speed drive means whereby said first member may drive the spooling drum, said means including a second member rotatably mounted on the drumshaft and a second clutch for releasably connecting the second member in driving relationship with said drumshaft, an auxiliary brake positioned coaxially of the lineshaft, and a clutch for connecting the brake to the lineshaft, whereby the brake may act through the low speed drive means to resist unspooling movement of the drum upon the first and second clutches being disengaged.

4. In a rotary drawworks, the combination of a drumshaft, a spooling drum on said drumshaft, a lineshaft, low speed drive means whereby the lineshaft may drive the spooling drum, including a large driven sprocket fixed relative to the spooling drum and a small driving sprocket fixed relative to the lineshaft and connected by a chain, a first member rotatably mounted coaxially of the lineshaft, a first clutch for releasably connecting said member in driving relationship with the lineshaft, high speed drive means whereby said first member may drive the spooling drum, said means including a second member rotatably mounted on the drumshaft and a second clutch for releasably connecting the second member in driving relationship with said drumshaft, an auxiliary brake positioned coaxially of the lineshaft, and a clutch for connecting the brake to the lineshaft, whereby the brake may act through the low speed drive means to resist unspooling movement of the drum upon the first and second clutches being disengaged.

5. In a rotary drawworks, the combination of a drumshaft, axially spaced bearings for rotatably supporting the drumshaft, a spooling drum fixed on said drumshaft between said bearings, a lineshaft, low speed drive means whereby the lineshaft may drive the spooling drum, including a driven element fixed relative to the spooling drum and a driving element fixed relative to the lineshaft, a first member rotatably mounted coaxially of the lineshaft, a first fluid operated friction clutch for releasably connecting said member in driving relationship with the lineshaft, high speed drive means whereby said first member may drive the spooling drum, said means including a second member rotatably mounted on an overhanging end of the drumshaft outside said bearings and a second fluid operated friction clutch for releasably connecting the second member in driving relationship with said drumshaft, an auxiliary brake positioned coaxially of the lineshaft, and a releasable over-running clutch for connecting the brake to the lineshaft, whereby the brake may act through the low speed drive means to resist unspooling movement of the drum upon the first and second friction clutches being disengaged.

6. In a rotary drawworks, the combination of a drumshaft, a spooling drum on said drumshaft, a lineshaft, low speed drive means whereby the lineshaft may drive the spooling drum, including a driven element fixed relative to the spooling drum and a driving element fixed relative to the lineshaft, a first member rotatably mounted coaxially of the lineshaft, a first fluid operated friction clutch for releasably connecting said member in driving relationship with the lineshaft, high speed drive means whereby said first member may drive the spooling drum, said means including a second member rotatably mounted on the drumshaft and a second fluid operated friction clutch for releasably connecting the second member in driving relationship with said drumshaft, means whereby the first member may be driven from a source of power, means whereby the second member may drive a power take-off element, an auxiliary brake positioned coaxially of the lineshaft, and a releasable over-running clutch for connecting the brake to the lineshaft, whereby the brake may act through the low speed drive means to resist unspooling movement of the drum upon the first and second friction clutches being disengaged.

7. In a rotary drawworks, the combination of a drumshaft, axially spaced bearings for rotatably supporting the drumshaft, a spooling drum fixed on said drumshaft between said bearings, a lineshaft, low speed drive means whereby the lineshaft may drive the spooling drum, including a large driven sprocket fixed relative to the spooling drum and a small driving sprocket fixed relative to the lineshaft and connected by a chain, a first member rotatably mounted coaxially of the lineshaft, a first fluid operated friction clutch for releasably connecting said member in driving relationship with the lineshaft, high speed drive means whereby said first member may drive the spooling drum, said means including a second member rotatably mounted on an overhanging end of the drumshaft outside said bearings and a second fluid operated friction clutch for releasably connecting the second member in driving relationship with said drumshaft, means whereby the first member may be driven from a source of power, means whereby the second member may drive a power take-off element, an auxiliary brake positioned coaxially of the lineshaft, and a releasable over-running clutch for connecting the brake to the lineshaft, whereby the brake may act through the low speed drive means to resist unspooling movement of the drum upon the first and second friction clutches being disengaged.

8. In a rotary drawworks, the combination of a drumshaft, axially spaced bearings for rotatably supporting the drumshaft, a spooling drum fixed on said drumshaft between said bearings, a lineshaft, low speed drive means whereby the lineshaft may drive the spooling drum, including a large driven sprocket fixed relative to the spooling drum and a small driving element fixed relative to the lineshaft and connected by a chain, a first dual sprocket member rotatably mounted coaxially of the lineshaft, a first clutch for releasably connecting said member in driving relationship with the lineshaft, high speed drive means whereby said first member may drive the spooling drum, said means including a second dual sprocket member rotatably mounted on an overhanging end of the drumshaft outside said bearings and a second clutch for releasably connecting the second member in driving relationship with said drumshaft, a chain connecting one of the sprockets on each member, means whereby the other sprocket on the first member may be driven from a source of power, means whereby the other sprocket on the second member may drive a power take-off element, an auxiliary brake positioned coaxially of the lineshaft, and a clutch for connecting the brake to the lineshaft, whereby the brake may act through the low speed drive means to resist unspooling movement of the drum upon the first and second friction clutches being disengaged.

9. In a rotary drawworks, the combination of a drumshaft, a spooling drum fixed on the drumshaft, a lineshaft, low speed drive means whereby the lineshaft may drive the spooling drum including a large driven sprocket fixed relative to the spooling drum and a small driving sprocket fixed relative to the lineshaft and connected by a chain, a first member rotatably mounted coaxially of the lineshaft, a first clutch for releasably connecting said member in driving relationship with the lineshaft, high speed drive means whereby said first member may drive the spooling drum, said means including a second member rotatably mounted on the drum shaft and a second clutch for releasably connecting the second member in driving relationship with said lineshaft, means whereby the first member may be driven from a source of power, means whereby the second member may drive a power take-off element, an auxiliary brake positioned coaxially of the lineshaft, and a releasable over-running clutch for connecting the brake to the lineshaft whereby the brake may act through the low speed drive means to resist unspooling movement of the drum upon the first and second clutches being disengaged.

JOHN B. PICARD.

References Cited in the file of this patent
UNITED STATES PATENTS

| Number | Name | Date |
| --- | --- | --- |
| 1,010,935 | Meek | Dec. 5, 1911 |
| 2,157,211 | McDonald | May 9, 1939 |
| 2,304,350 | Gillett | Dec. 8, 1942 |
| 2,339,449 | Ashton | Jan. 18, 1944 |
| 2,344,681 | Deschner | Mar. 21, 1944 |
| 2,354,235 | Walton | July 25, 1944 |
| 2,536,483 | Young | Jan. 2, 1951 |
| 2,563,089 | Wilson | Aug. 7, 1951 |